No. 875,022.   PATENTED DEC. 31, 1907.
J. H. WESTCOTT.
CHUCK.
APPLICATION FILED JAN. 8, 1906.

WITNESSES
Rich A. George
E. P. De Giorgi

INVENTOR
JAMES H. WESTCOTT.
BY Risley & Love
ATTORNEYS.

UNITED STATES PATENT OFFICE.

JAMES H. WESTCOTT, OF ONEIDA, NEW YORK, ASSIGNOR OF ONE-HALF TO WESTCOTT CHUCK COMPANY, OF ONEIDA, NEW YORK, A CORPORATION OF NEW YORK.

CHUCK.

No. 875,022.  Specification of Letters Patent.  Patented Dec. 31, 1907.

Application filed January 8, 1906. Serial No. 295,015.

*To all whom it may concern:*

Be it known that I, JAMES H. WESTCOTT, a citizen of the United States, residing at Oneida, in the county of Madison and State of New York, have invented certain new and useful Improvements in Chucks, of which the following is a specification, reference being had therein to the accompanying drawing.

My invention relates to an improved chuck, and I do declare that the following is a full, clear, concise and exact description thereof sufficient to enable one skilled in the art to make and use the same, reference being had to the accompanying drawings in which like letters and numerals refer to like parts throughout.

My invention covers an improved jaw and cradle and is shown in a familiar form of lathe or drill chuck. Its purpose is to facilitate the operation of such chuck by providing a means for positioning the several dogs on their mounts at an exactly equal distance from the center of the chuck so that by the use of the scroll ring they may be simultaneously moved toward or from the center, always being maintained severally at an equal distance from the center.

A further advantage is that all lost motion or looseness of fitting of the dogs on their mounts can be taken up and the dogs locked, so to speak, on the cradles on which they are carried, so that when they are brought in the work is held exactly centered and there is no room for variations through any inexactness in the position of the several dogs relative to the center or on its mount.

A still further improvement is in the form of the teeth on the jaws so as to increase their efficiency.

Further particulars of improvement will appear from the specifications and drawings.

Figure 1:
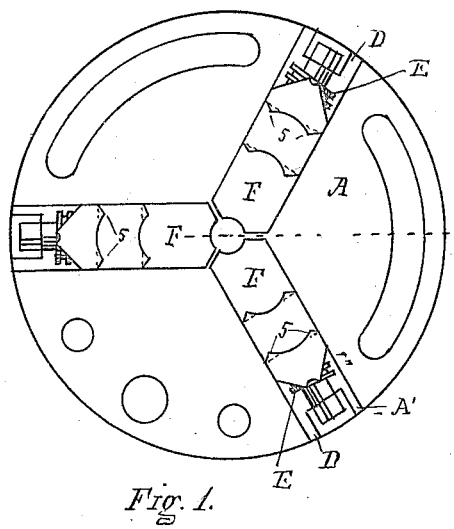
Figure 4:
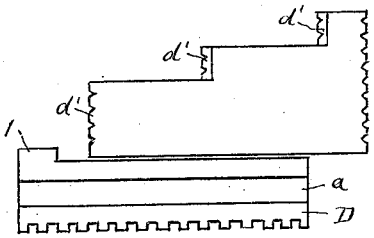
Figure 3:
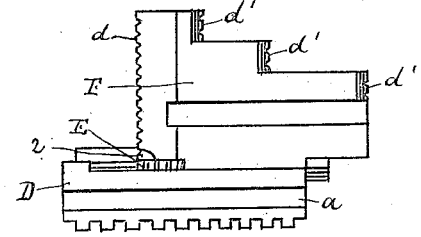
Figure 5:
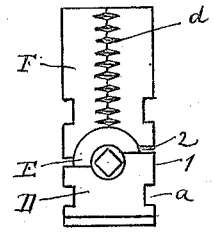
Figure 2:
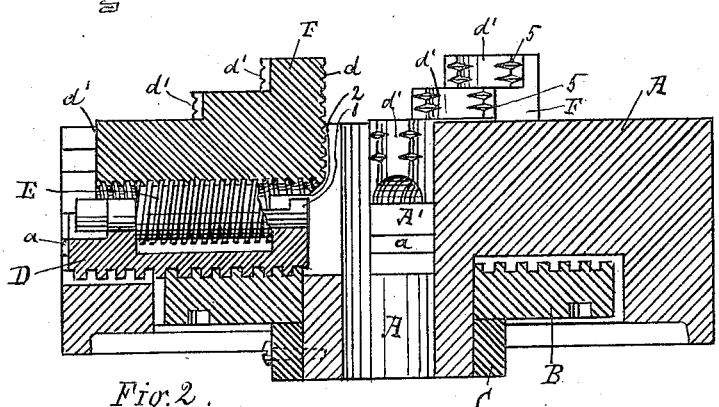

In the drawings Figure 1 is a plan view of such a chuck as mentioned; Fig. 2 is a section view on the line $x$—$x$ of Fig. 1, the inner end of the screw being cut away to show the far side of the cradle and dog, the dogs being in different positions; Fig. 3 is a side view of the sliding box or cradle with the screw and the dog thereon; Fig. 4 is a like view of the same parts with the dog turned end for end, and Fig. 5 is an end view of the same parts in Fig. 3.

Referring to the figures in detail, A is the body of the chuck having radial grooves A'. The back is cut out to receive the scroll-faced ring B which is held in place by the nut or ring C suitably secured to the body of the chuck. In the radial grooves A' are sliding boxes or cradles D cut out on the bottom to engage the scrolls of ring B by the turning of which they are simultaneously advanced or withdrawn. They slide on ways and grooves $a$. Each cradle D supports in journals a screw E, adapted to be turned by a wrench applied to nut head on the end of the screw. Dogs F are provided to slide in the radial grooves A' and are fitted on the lower face, which, is curved, to engage screws E to be moved to and fro. The dogs have straight faces $d$ on one end and have a series of oppositely disposed faces $d'$ to allow of working articles of various sizes. These parts are well known.

In operation the dogs are adjusted as desired and are together moved to or from the work in the center. In case the work is of irregular shape the dogs may be adjusted severally to suit the need, and then be brought together or tightened by the high power of a wrench on the scroll faced ring, or the adjustment may be made of the several dogs after the use of the ring has brought them close to the work.

Adjacent to the inner end of the cradle I provide a stop 1, so located as to be engaged by the dog F when projected. The dog F is cut away at one end, as shown at 2 in Fig. 3. This is done so that the faces $d$ can be brought close to the center to hold small articles. The other end of the dog need not be so cut because the faces $d'$ are provided to hold articles of larger size and those faces need not be brought so near the center. When the dog is brought toward the center it is blocked by contact with the stop 1. Further turning of the screw E tightens that contact, forces the threads of the screw against the co-threads or grooves of the dog and forces the butt end of the screw tightly against the abutment on the cradle and the cradle is forced back on the scrolls of the scroll ring. In this way I provide a positive and fixed location of the dog, eliminating any variation or looseness of its position through too free fittings or by reason of wear on the parts and without crowding the dogs too close against the work. The position of each cradle or box being fixed by means of the scroll-faced ring, the dogs are always in the same position relative to the center, require no separate adjustment and have no opportunity to loosen their grip which will always be the same on each of a number of like pieces of work.

It will thus be seen that I have provided a chuck which like those of ordinary type is available for use on work of irregular form where the dogs are not all an equal distance from the center of the chuck. At the same time by my invention the device has a further function and utility in that, when work is to be done on articles of symmetrical form the several dogs can be firmly locked relative to their respective boxes or cradles as though they were integral and the boxes likewise locked relative to the scroll ring as though integral therewith, all lost motion or looseness of the parts being taken up at once for each successive piece of work.

A further improvement in the dogs lies in the fact that the gripping faces $d'$ are not cut on a curve concentric with the center of the chuck. They are cut on shorter radii as shown in Fig. 1 by the line 5—5. This throws into projection the two points at the end of such curve whereby the teeth have two bearing points on the work and may be more or less finished to adapt them to grip the work more firmly than is possible by a surface which has its center at the center of the chuck.

Having described my invention, what I claim as new and desire to secure by Letters Patent, is:

1. In a chuck provided with a cradle, a screw and a dog in engagement therewith, the dog being slidably mounted to admit complete outward movement thereof, a lug on the cradle at its inner end providing a stop to the inward movement of the dog, substantially as described.

2. A scroll-chuck comprising a scroll-ring, a cradle, a screw and a dog severally arranged in coöperative engagement, the said cradle and dog having means to stop the inward movement of the latter on the former whereby the operation of the connected members is effective to take up lost motion in the operation of the chuck, the said parts being constructed and arranged to permit complete outward movement of the dog relative to the cradle.

In testimony whereof I affix my signature in presence of two witnesses.

JAMES H. WESTCOTT.

Witnesses:
  THEODORE F. HAND, Jr.,
  RAYMOND J. BREWER.